(12) United States Patent
Lin et al.

(10) Patent No.: US 7,852,621 B2
(45) Date of Patent: Dec. 14, 2010

(54) COMPUTER WITH A ROTARY MODULE DRIVEN BY MAGNETIC FORCES

(75) Inventors: Cheng-Hung Lin, Taipei Hsien (TW); Shih-Jeh Lin, Taipei Hsien (TW)

(73) Assignee: Wistron Corporation, Hsi-Chih, Taipei Hsien (TW)

( * ) Notice: Subject to any disclaimer, the term of this patent is extended or adjusted under 35 U.S.C. 154(b) by 192 days.

(21) Appl. No.: 12/349,526

(22) Filed: Jan. 7, 2009

(65) Prior Publication Data
US 2009/0296328 A1    Dec. 3, 2009

(30) Foreign Application Priority Data
May 29, 2008    (TW) .............................. 97209406 U

(51) Int. Cl.
*H05K 5/00*    (2006.01)
(52) U.S. Cl. ............... 361/679.02; 335/207; 292/251.5; 24/303
(58) Field of Classification Search ............ 361/679.02; 335/207; 292/251.5, DIG. 37; 24/303
See application file for complete search history.

(56) References Cited

U.S. PATENT DOCUMENTS

| | | | | |
|---|---|---|---|---|
| 6,366,440 B1 * | 4/2002 | Kung | ........................ | 361/147 |
| 6,653,919 B2 * | 11/2003 | Shih-Chung et al. | ........ | 335/207 |
| 6,891,722 B2 * | 5/2005 | Chen et al. | ............. | 361/679.55 |
| 6,922,333 B2 * | 7/2005 | Weng et al. | ............... | 361/679.2 |
| 7,082,035 B2 * | 7/2006 | Kim | ........................... | 361/726 |
| 7,332,990 B2 * | 2/2008 | Lo et al. | ..................... | 335/205 |
| 7,583,500 B2 * | 9/2009 | Ligtenberg et al. | ..... | 361/679.27 |
| 7,661,732 B2 * | 2/2010 | Hsu et al. | ................ | 292/251.5 |
| 7,775,567 B2 * | 8/2010 | Ligtenberg et al. | ....... | 292/251.5 |
| 2005/0167992 A1 * | 8/2005 | Lo et al. | .................. | 292/251.5 |
| 2006/0261605 A1 * | 11/2006 | Ku et al. | .................. | 292/251.5 |
| 2008/0048654 A1 * | 2/2008 | Takahashi et al. | ...... | 324/207.25 |
| 2008/0061565 A1 * | 3/2008 | Lee et al. | ................. | 292/251.5 |
| 2008/0179897 A1 * | 7/2008 | Wu et al. | .................. | 292/251.5 |
| 2008/0186683 A1 * | 8/2008 | Ligtenberg et al. | .......... | 361/726 |
| 2008/0309098 A1 * | 12/2008 | Hsu et al. | ................ | 292/251.5 |
| 2009/0268386 A1 * | 10/2009 | Lin | ....................... | 361/679.02 |

* cited by examiner

*Primary Examiner*—Lisa Lea-Edmonds
(74) *Attorney, Agent, or Firm*—Winston Hsu; Scott Margo

(57) ABSTRACT

A computer includes a housing whereon an opening is formed, and a containing space is formed inside the housing. The computer further includes a rotary module installed inside the containing space in a rotatable manner, a first magnetic component connected to an end of the rotary module, a second magnetic component disposed on a side of the first magnetic component for attracting or repulsing the first magnetic component so as to switch the rotary module in a first position or in a second position, and a switch for converting magnetic field of the second magnetic component so that the second magnetic attracts or repulses the first magnetic component.

20 Claims, 8 Drawing Sheets

US 7,852,621 B2

COMPUTER WITH A ROTARY MODULE DRIVEN BY MAGNETIC FORCES

BACKGROUND OF THE INVENTION

1. Field of the Invention

The present invention relates to a computer, and more particularly, to a computer with a rotary module driven by magnetic forces so as to locate in different positions.

2. Description of the Prior Art

Generally, an LCD monitor of a notebook computer needs to open or close for many times. For preventing wearing away the LCD monitor, a pad is utilized for disposing on a surface of the LCD monitor. However, there are differences of paint color and material between the pad and the surface of the LCD monitor so as to reduce aesthetic feeling of outward appearance.

SUMMARY OF THE INVENTION

According to the claimed invention, a computer includes a housing whereon an opening is formed, and a containing space is formed inside the housing. The computer further includes a rotary module installed inside the containing space in a rotatable manner, a first magnetic component connected to an end of the rotary module, a second magnetic component disposed on a side of the first magnetic component for attracting or repulsing the first magnetic component so as to switch the rotary module in a first position or in a second position, and a switch for converting magnetic field of the second magnetic component so that the second magnetic attracts or repulses the first magnetic component.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
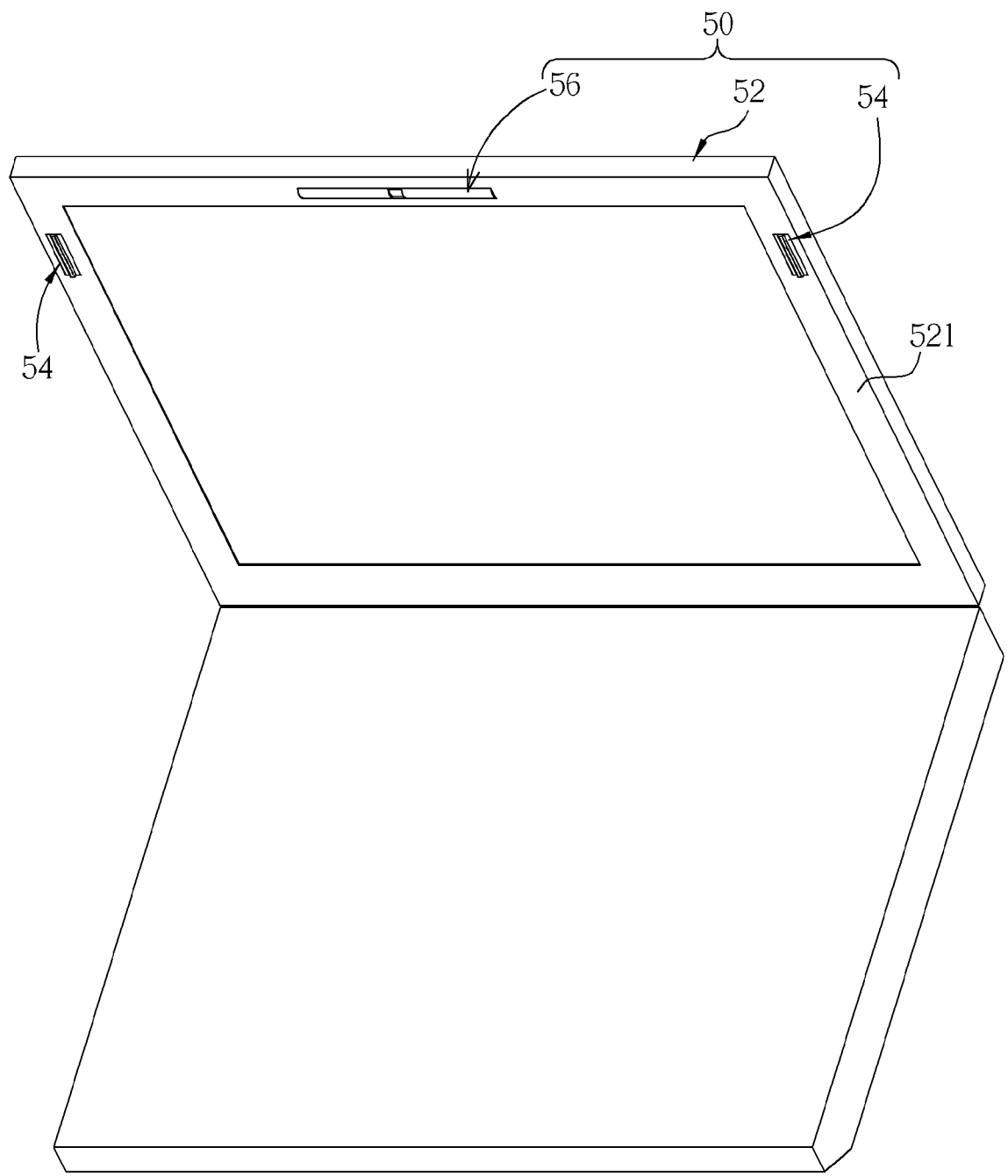
FIG. 1 is a perspective drawing of a computer according to a preferred embodiment of the present invention.

Please refer to FIG. 1. FIG. 1 is a perspective drawing of a computer 50 according to a preferred embodiment of the present invention. The computer 50 can be a notebook computer. The computer 52 includes a housing 52. The housing 52 includes a surface 521. The housing 52 can be a display housing, such as an LCD monitor housing. The computer 50 further includes two first rotary modules 54 disposed on both sides of the housing 52 respectively, and a second rotary module 56 disposed on an upper side of the housing 52. The number and the position of the first rotary module 54 and the second rotary module 56 are not limited to the embodiment illustrated in FIG. 1. The first rotary module 54 and the second rotary module 56 can be disposed selectively. That is, the computer 50 can only have the first rotary module 54 or the second rotary module 56 depending on design demand.

Figure 2:
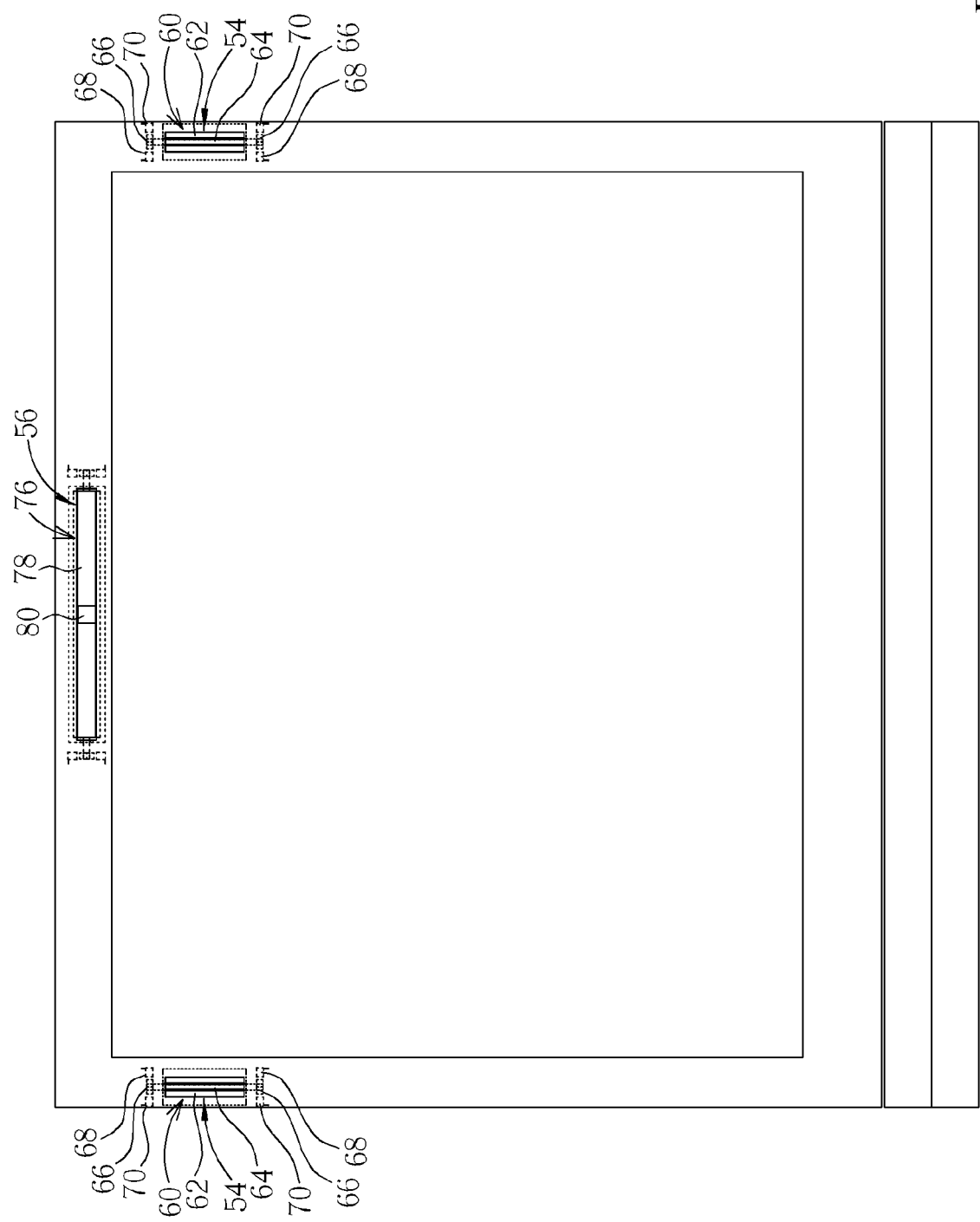
FIG. 2 is a diagram of a first rotary module and a second rotary module installed inside a housing according to the preferred embodiment of the present invention.
Figure 3:
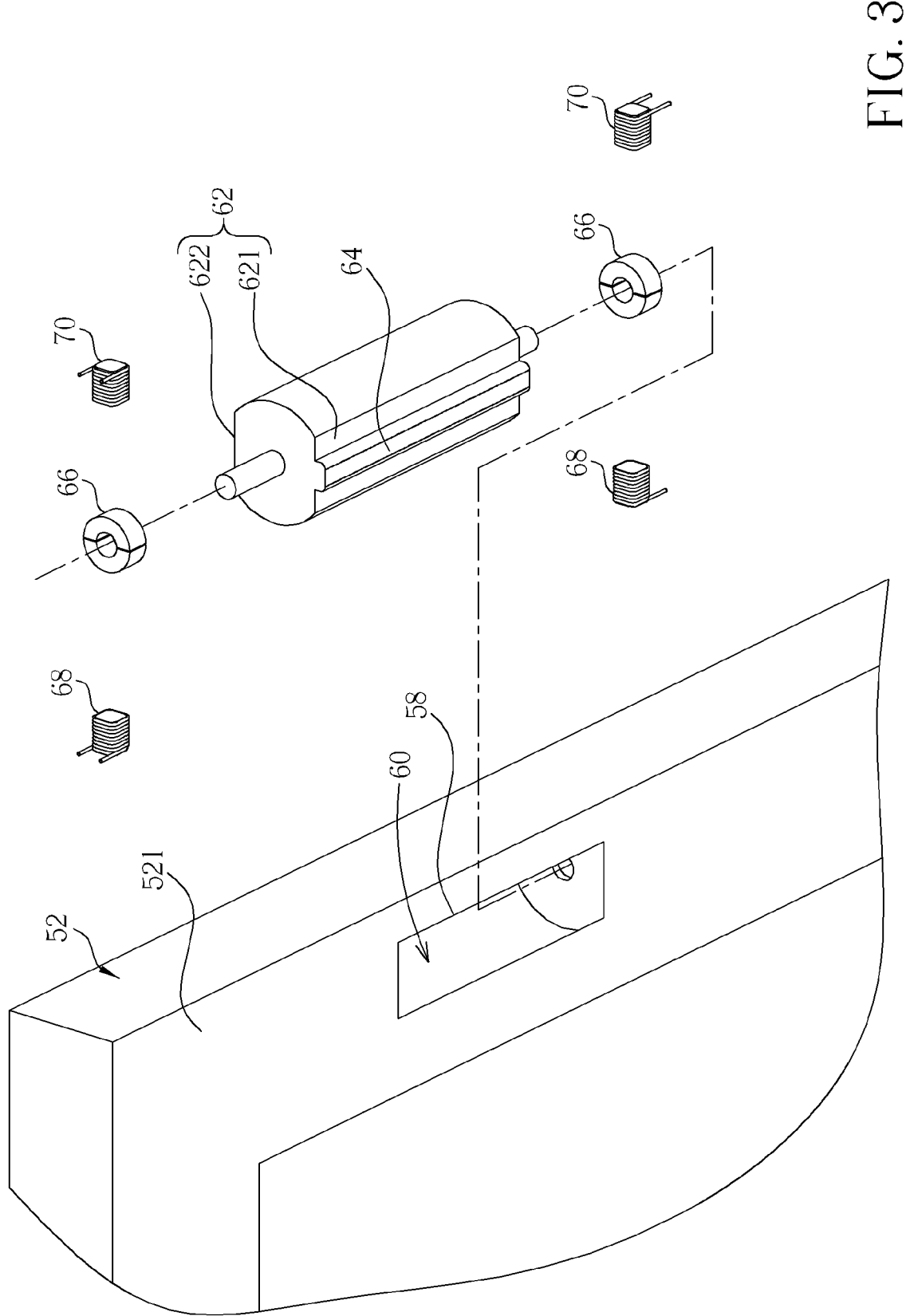
FIG. 3 is an exploded drawing of the first rotary module according to the preferred embodiment of the present invention.
Figure 4:
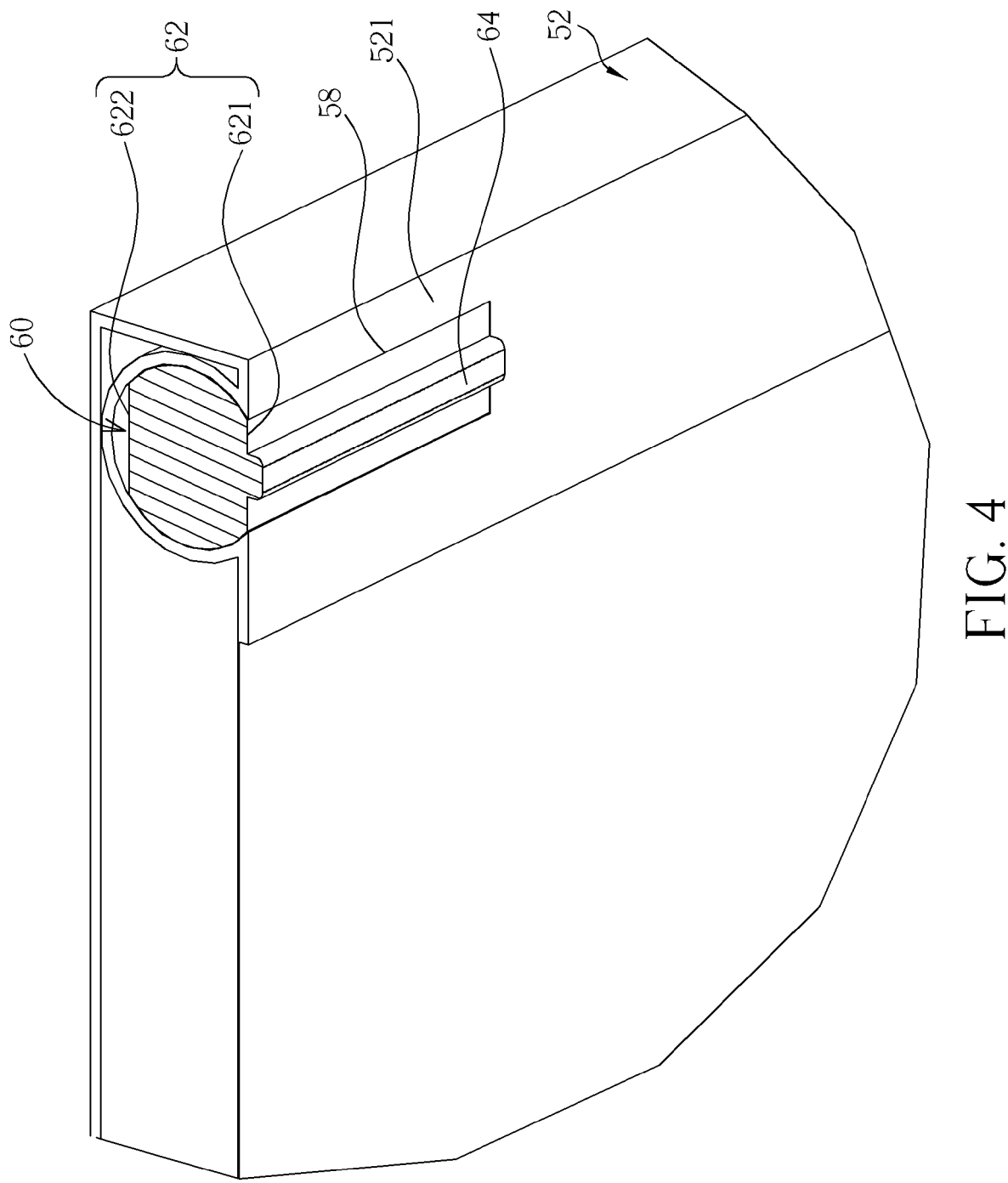
FIG. 4 is a sectional diagram of the first rotary module installed inside the housing according to the preferred embodiment of the present invention.

Please refer to FIG. 2 to FIG. 4. FIG. 2 is a diagram of the first rotary module 54 and the second rotary module 56 installed inside the housing 52 according to the preferred embodiment of the present invention. FIG. 3 is an exploded drawing of the first rotary module 54 according to the preferred embodiment of the present invention. FIG. 4 is a sectional diagram of the first rotary module 54 installed inside the housing 52 according to the preferred embodiment of the present invention. Both of the first rotary modules 54 have the same structure and working principle, and thus one of the first rotary modules 54 is introduced as follows. A first opening 58 is disposed on the housing 52, and a first containing space 60 is formed inside the housing 52. The first rotary module 54 is installed inside the first containing space 60 in a rotatable manner, such as being pivoted to the housing 52. The first rotary module 54 includes a bar 62 pivoted to the housing 52. The bar 62 includes a first side 621 and a second side 622 opposite to the first side 621. The first side 621 and the second side 622 can be planes respectively. The second side 622 of the bar 62 and the surface 521 of the housing 52 can be made of same material and have same paint color so that the second side 622 of the bar 62 corresponds with the surface 521 of the housing 52 in an outward appearance. The first rotary module 54 further includes a pad 64 disposed on the first side 621 of the bar 62. The pad 64 can be made of rubber material. When an LCD monitor of the computer 50 is close, the pad 64 can support the LCD monitor for preventing from being worn away. The computer 50 further includes two first magnetic components 66 connected to both ends of the bar 62 of the first rotary module 54 respectively. The first magnetic component 66 can be glued to or welded with the bar 62. A second magnetic component 68 and a third magnetic component 70 are disposed on both sides of each first magnetic component 66. The first magnetic component 66 can be a permanent magnet and a circular structure. The second magnetic component 68 and the third magnetic component 70 can be electromagnets respectively having an iron core and copper enameled wires wound around the iron core.

Figure 5:
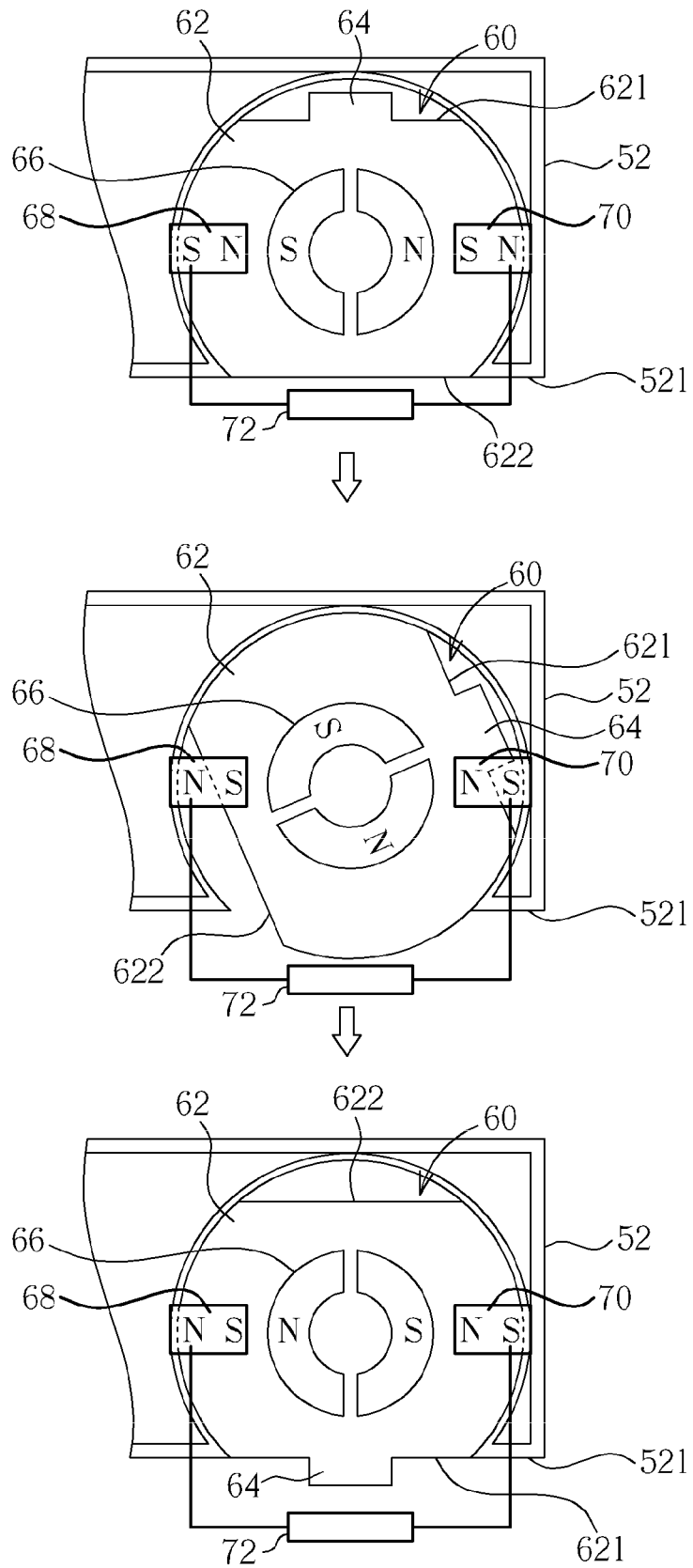
FIG. 5 is a diagram of the first rotary module rotating from a second position to a first position according to the preferred embodiment of the present invention.

Please refer to FIG. 5. FIG. 5 is a diagram of the first rotary module 54 rotating from a second position to a first position according to the preferred embodiment of the present invention. When the first rotary module 54 is located in the second position, the pad 64 is contained inside the first containing space 60 of the housing 52 and the second side 622 of the bar 62 is level with the surface 521 of the housing 52 substantially. Because the second side 622 of the bar 62 and the surface 521 of the housing 52 can be made of same material and have same paint color, the second side 622 of the bar 62 and the surface 521 of the housing 52 perform as an integrated body in the outward appearance. A switch 72 electrically connected to the second magnetic component 68 and the third magnetic component 70 can electrify the second magnetic component 68 and the third magnetic component 70 with a first current direction so that the second magnetic component 68 and the third magnetic component 70 attract the first magnetic component 66. For example, the switch 72 can electrify the second magnetic component 68 so as to generate a magnetic pole of an end of the second magnetic component 68 close to an end of the first magnetic component 66 with an opposite magnetic pole. As shown in the upper diagram of FIG. 5, the end of the second magnetic component 68 close to the first magnetic component 66 is an N pole, and the end of the first magnetic component 66 close to the second magnetic component 68 is a S pole correspondingly. Similarly, the end of the second magnetic component 68 close to the first magnetic component 66 can be an S pole, and the end of the first magnetic component 66 close to the second magnetic component 68 can be a N pole correspondingly. On the other hand, the switch 72 can electrify the third magnetic component 70 so as to generate a magnetic pole of an end of the third magnetic component 68 close to an end of the first magnetic component 66 with an opposite magnetic pole. As shown in an upper diagram of FIG. 5, the end of the third magnetic component 70 close to the first magnetic component 66 is an S pole, and the end of the first magnetic component 66 close to the third magnetic component 70 is an N pole correspondingly. Similarly, the end of the third magnetic component 70 close to the first magnetic component 66 can be an N pole, and the end of the first magnetic component 66 close to the third magnetic component 70 can be an S pole correspondingly. At this time, the second magnetic component 68 and the third magnetic component 70 attract the first magnetic component 66 with each other so as to fix the first rotary module 54 in the second position.

The first rotary module 54 needs to rotate from the second position to the first position when using the pad 64. The switch 72 can electrify the second magnetic component 68 and the third magnetic component 70 with a second current direction opposite to the first current direction so that the second magnetic component 68 and the third magnetic component 70 repulse the first magnetic component 66. For example, the switch 72 can electrify the second magnetic component 68 so as to generate a magnetic pole of an end of the second magnetic component 68 close to an end of the first magnetic component 66 with a same magnetic pole. As shown in the middle diagram of FIG. 5, the magnetic fields of the second magnetic component 68 and the third magnetic component 70 convert after being electrified with the second current direction opposite to the first current direction. That is, the end of the second magnetic component 68 close to the first magnetic component 66 is a S pole, and the end of the third magnetic component 70 close to the first magnetic component 66 is a N pole so that there are repulsive magnetic forces between the second magnetic component 68, the third magnetic component 70, and the first magnetic component 66 for driving the first rotary module 54 to rotate from the second position to the first position as shown in the bottom diagram of FIG. 5. When the first rotary module 54 is located in the first position, the pad 64 is exposed out of the first opening 58 on the housing 52 completely for supporting the LCD monitor. At this time, the end of the second magnetic component 68 close to the first magnetic component 66 is the S pole, the end of the first magnetic component 66 close to the second magnetic component 68 is the N pole, the end of the third magnetic component 70 close to the first magnetic component 66 is the N pole, and the end of the first magnetic component 66 close to the third magnetic component 70 is the S pole so that there are attractive magnetic forces between the second magnetic component 68, the third magnetic component 70, and the first magnetic component 66 for fixing the first rotary module 54 in the first position.

Figure 6:
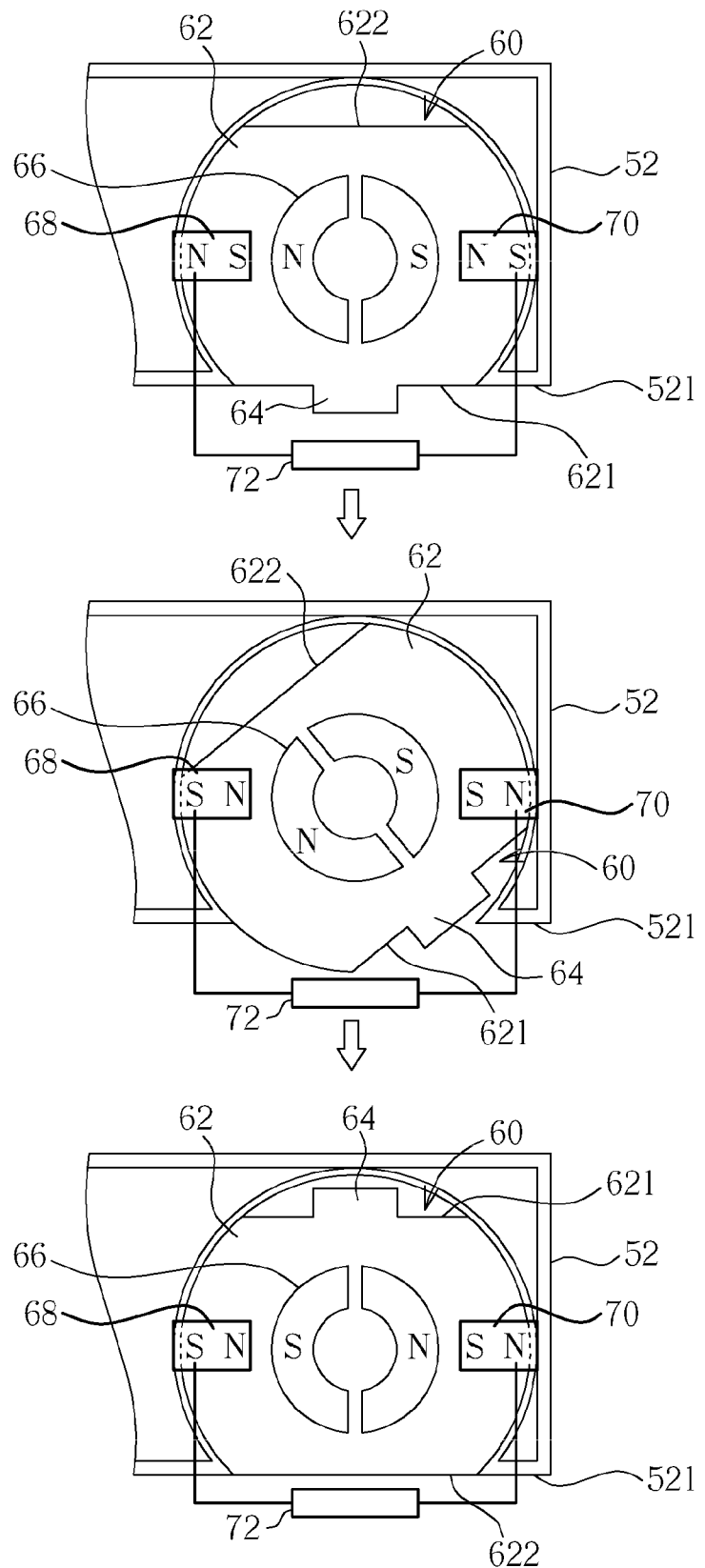
FIG. 6 is a diagram of the first rotary module rotating from the first position to the second position according to the preferred embodiment of the present invention.

On the contrary, the first rotary module 54 needs to rotate from the first position to the second position when receiving the pad 64 in the first containing space 60 inside the housing 52. Please refer to FIG. 6. FIG. 6 is a diagram of the first rotary module 54 rotating from the first position to the second position according to the preferred embodiment of the present invention. When the switch 72 electrifies the second magnetic component 68 and the third magnetic component 70 with the first current direction, the magnetic fields of the second magnetic component 68 and the third magnetic component 70 convert again after being electrified with the first current direction opposite to the second current direction as shown in the middle diagram of FIG. 6. At this time, the end of the second magnetic component 68 close to the first magnetic component 66 is the N pole, and the end of the third magnetic component 70 close to the first magnetic component 66 is the S pole so that there are repulsive magnetic forces between the second magnetic component 68, the third magnetic component 70, and the first magnetic component 66 for driving the first rotary module 54 to rotate from the first position to the second position as shown in the bottom diagram of FIG. 6. At this time, the end of the second magnetic component 68 close to the first magnetic component 66 is the N pole, the end of the first magnetic component 66 close to the second magnetic component 68 is the S pole, the end of the third magnetic component 70 close to the first magnetic component 66 is the S pole, and the end of the first magnetic component 66 close to the third magnetic component 70 is the N pole so that there are attractive magnetic forces between the second magnetic component 68, the third magnetic component 70, and the first magnetic component 66 for fixing the first rotary module 54 in the second position.

Additionally, the switch 72 can be a button so that a user can press the button to switch current directions of the second magnetic component 68 and the third magnetic component 70. The switch 72 also can be linked to other mechanism or application. For example, the switch 72 can be actuated when opening/closing the LCD monitor, switching on or off the suspend mode, and so on. Any mechanism for switching current directions of the second magnetic component 68 and the third magnetic component 70 so as to convert magnetic fields of the second magnetic component 68 and the third magnetic component 70 is within the scope of the present invention.

Figure 7:
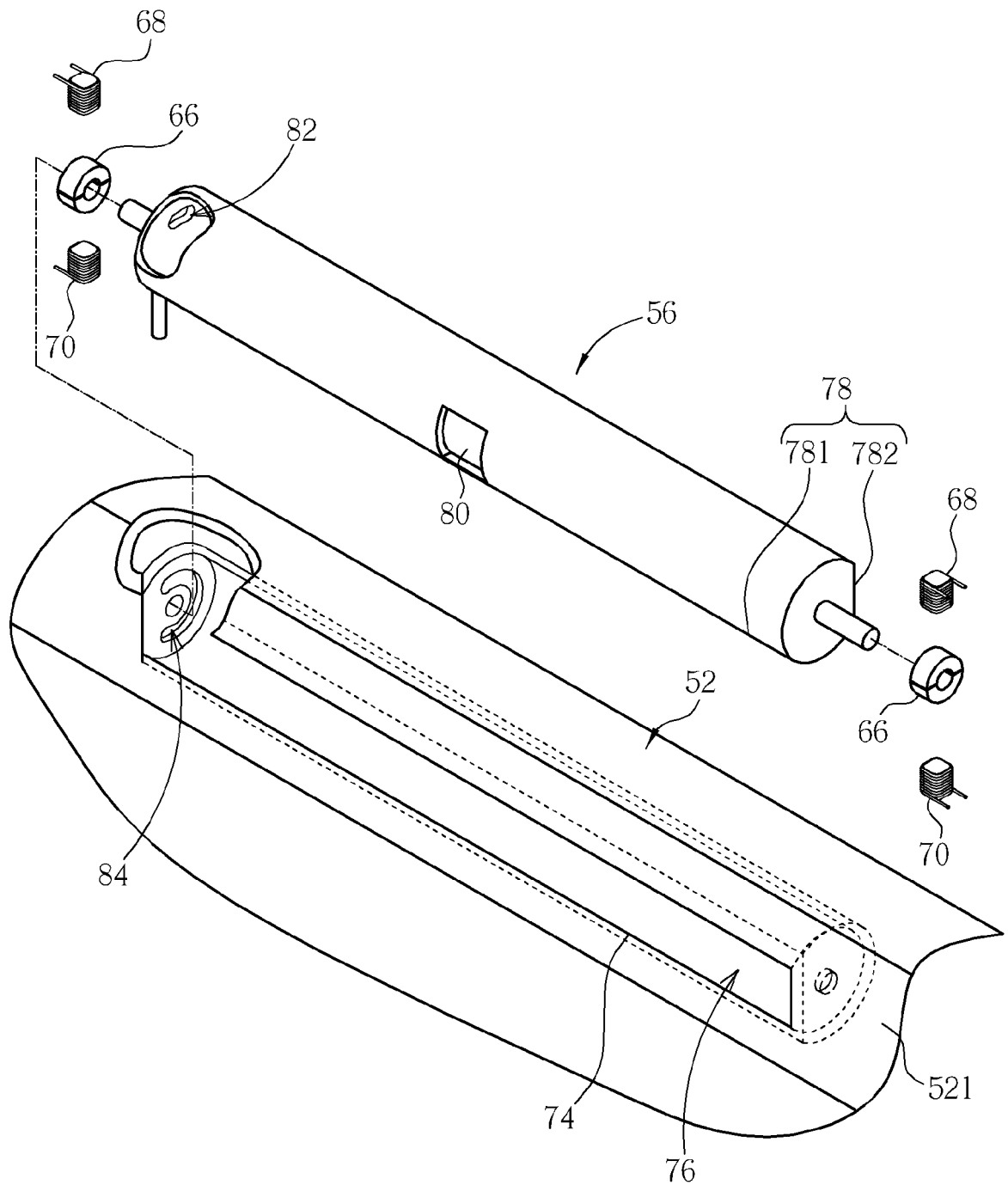
FIG. 7 is an exploded drawing of a second rotary module according to the preferred embodiment of the present invention.
Figure 8:
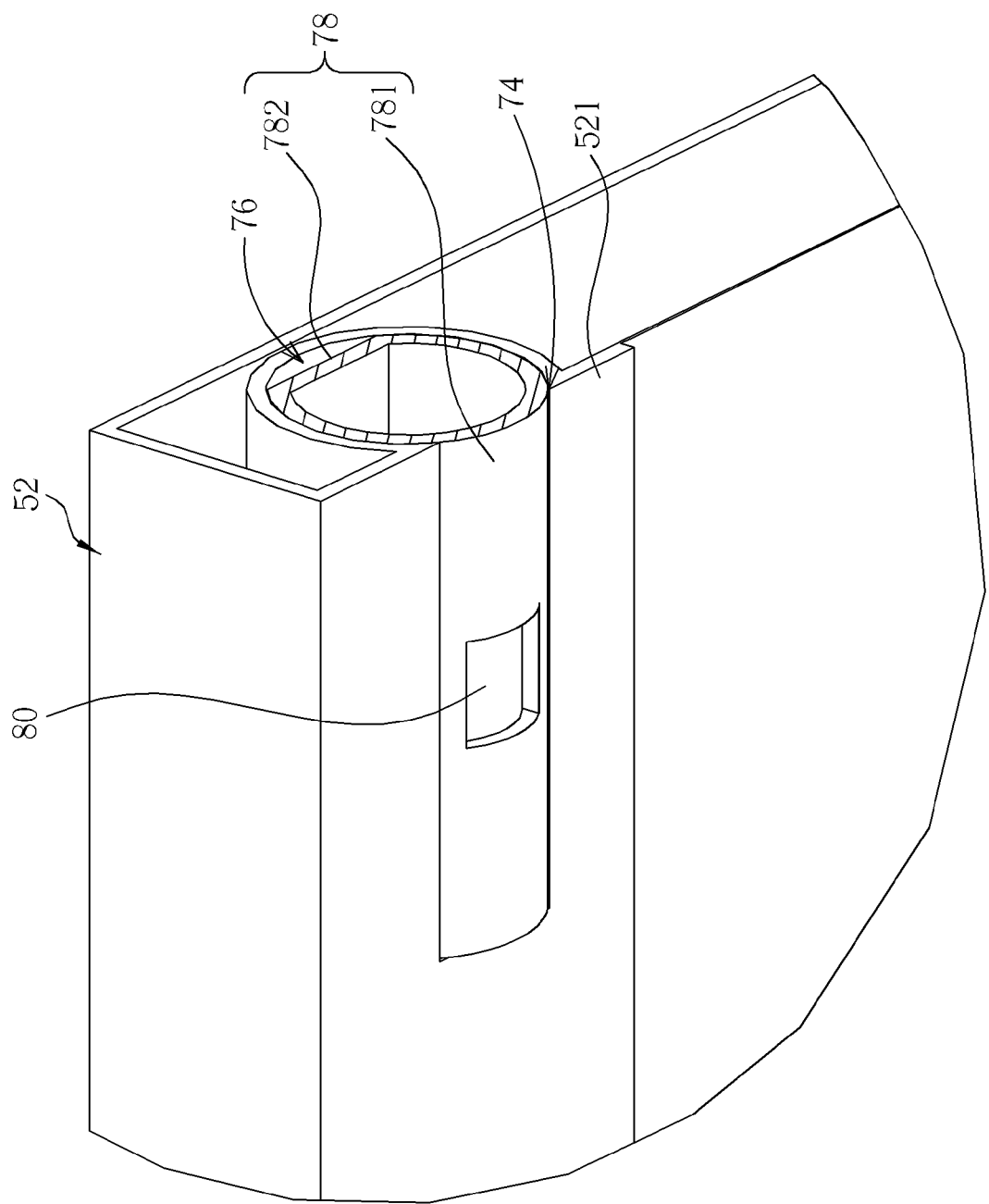
FIG. 8 is a sectional diagram of the second rotary module installed inside the housing according to the preferred embodiment of the present invention.

Please refer to FIG. 7 and FIG. 8. FIG. 7 is an exploded drawing of the second rotary module 56 according to the preferred embodiment of the present invention. FIG. 8 is a sectional diagram of the second rotary module 56 installed inside the housing 52 according to the preferred embodiment of the present invention. A second opening 74 is formed on the housing 52, and a second containing space 76 is formed inside the housing 52. The second rotary module 56 can be disposed inside the second containing space 76 in a rotatable manner, such as being pivoted to the housing. The second rotary module 54 includes a bar 78 pivoted to the housing 52. The bar 78 can be a hollow bar for containing an electronic component. The bar 78 includes a first side 781 and a second side 782 opposite to the first side 781. The first side 781 can be an arc surface, and the second side 782 can be a plane. The second side 782 of the bar 78 and the surface 521 of the housing 52 can be made of same material and have same paint color so that the second side 782 of the bar 78 corresponds with the surface 521 of the housing 52 in an outward appearance. The second rotary module 56 further includes an electronic component 80 disposed on the first side 781 of the bar 78. The electronic component 80 can be an image capturing component, such as a camera, a speaker, an antenna, and so on. A first hole 82 is disposed on an end of the bar 78, and a second hole 84 is disposed on a side of the housing 52 corresponding to the first hole 82. A conducting wire of the electronic component 80 is capable of passing through the first hole 82 and the second hole 84 for connecting the electronic component 80 and other circuit inside the computer 50 electrically. The first hole 82 and the second hole 84 can be formed of arc shapes, such as a C-shaped hole so as to prevent interference between the conducting wire of the electronic component 80 and other structure when the second rotary module 56 rotates.

The electronic component 80 can be received inside the second containing space 76 by rotating the second rotary module 56 so as to provide protection and dust-proof functions for the electronic component 80 when not using the electronic component 80. At this time, the second side 782 of the bar 78 is level with the surface 521 of the housing 52 substantially. The second side 782 of the bar 78 and the surface 521 of the housing 52 can be made of same material and have same paint color, so the second side 782 of the bar 78 and the surface 521 of the housing 52 perform as an integrated body in the outward appearance. In addition, the electronic component 80 can be exposed out of the second opening 74 on the housing 52 by rotating the second rotary module 56 so as to perform functions of the electronic component 80, such as exposing a lens of a camera, a sound hole of a speaker, a receiving portion of an antenna, and so on. Both ends of the bar 78 of the second rotary module 56 are connected to the first magnetic components 66 respectively. The first magnetic component 66 can be glued to or welded with the bar 78. The second magnetic component 68 and the third magnetic component 70 are disposed on both sides of each first magnetic component 66. The first magnetic component 66 can be a permanent magnet and a circular structure. The second magnetic component 68 and the third magnetic component 70 can be electromagnets respectively having an iron core and copper enameled wires wound around the iron core. The working principle of the second rotary module 56 is the same as the working principle of the first rotary module 54, and hence a further description is hereby omitted.

In contrast with the prior art, the present invention utilizes magnetic forces to drive the rotary modules so as to switch the rotary modules in different positions for exposing a functional component when utilizing it or hiding the functional component for protection and the dust-proof function. The other side of the rotary module can be level with the surface of the housing and can be made of same material and have same paint color as the surface of the housing, so the rotary module and the surface of the housing perform as an integrated body in the outward appearance so as to increase aesthetic feeling of outward appearance.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A computer comprising:
    a housing whereon an opening is formed, and a containing space being formed inside the housing;
    a rotary module installed inside the containing space in a rotatable manner;
    a first magnetic component connected to an end of the rotary module;
    a second magnetic component disposed on a side of the first magnetic component for attracting or repulsing the first magnetic component so as to switch the rotary module in a first position or in a second position; and
    a switch for converting magnetic field of the second magnetic component so that the second magnetic component attracts or repulses the first magnetic component.

2. The computer of claim 1 wherein the second magnetic component is an electromagnet electrically connected to the switch, and the switch electrifies the second magnetic component with different current directions so that the second magnetic component attracts or repulses the first magnetic component.

3. The computer of claim 2 wherein the second magnetic component attracts the first magnetic component for fixing the rotary module in the first position when the switch electrifies the second magnetic component with a first current direction, and the second magnetic component repulses the first magnetic component for driving the rotary module to rotate from the first position to the second position when the switch electrifies the second magnetic component with a second current direction opposite to the first current direction.

4. The computer of claim 2 wherein the first magnetic component is a permanent magnet.

5. The computer of claim 1 further comprising a third magnetic component installed on the other side of the first magnetic component for attracting or repulsing the first magnetic component so as to switch the rotary module in the first position or in the second position with the second magnetic component together.

6. The computer of claim 5 wherein the third magnetic component is an electromagnet electrically connected to the switch, and the switch electrifies the third magnetic component with different current directions so that the third magnetic component attracts or repulses the first magnetic component.

7. The computer of claim 6 wherein the third magnetic component attracts the first magnetic component for fixing the rotary module in the first position when the switch electrifies the third magnetic component with a first current direction, and the third magnetic component repulses the first magnetic component for driving the rotary module to rotate from the first position to the second position when the switch electrifies the third magnetic component with a second current direction opposite to the first current direction.

8. The computer of claim 5 wherein the first magnetic component is a permanent magnet.

9. The computer of claim 1 wherein the rotary module comprises:
    a bar pivoted to the housing, the bar comprising a first side and a second side opposite to the first side; and
    a pad disposed on the first side of the bar;
    wherein the pad is exposed out of the opening on the housing completely when the rotary module rotates to the first position, and the pad is contained inside the containing space of the housing completely and the second side of the bar is exposed out of the opening on the housing completely when the rotary module rotates to the second position.

10. The computer of claim 9 wherein the second side of the bar is level with a surface of the housing substantially when the rotary module rotates to the second position.

11. The computer of claim 9 wherein the second side of the bar and the surface of the housing are made of same material.

12. The computer of claim 9 wherein the pad is made of rubber material.

13. The computer of claim 9 wherein the first magnetic component is connected to an end of the bar.

14. The computer of claim 1 wherein the rotary module comprises:

a bar pivoted to the housing, the bar comprising a first side and a second side opposite to the first side; and an electronic component disposed on the first side of the bar;

wherein the electronic component is exposed out of the opening on the housing completely when the rotary module rotates to the first position, and the electronic component is contained inside the containing space of the housing completely and the second side of the bar is exposed out of the opening on the housing completely when the rotary module rotates to the second position.

15. The computer of claim 14 wherein the second side of the bar is level with a surface of the housing substantially when the rotary module rotates to the second position.

16. The computer of claim 14 wherein the second side of the bar and the surface of the housing are made of same material.

17. The computer of claim 14 wherein the first side of the bar is an arc surface.

18. The computer of claim 14 wherein the second side of the bar is a plane.

19. The computer of claim 14 wherein the first magnetic component is connected to an end of the bar.

20. The computer of claim 14 wherein the electronic component is an image capturing component.

* * * * *